(12) United States Patent
Wellman

(10) Patent No.: US 7,806,064 B2
(45) Date of Patent: Oct. 5, 2010

(54) FRICTION REDUCING POLLUTION CONTROL SYSTEM FOR MARINE VEHICLES

(76) Inventor: John G. Wellman, 119 Goodson Loop, Pawleys Island, SC (US) 29585

( * ) Notice: Subject to any disclaimer, the term of this patent is extended or adjusted under 35 U.S.C. 154(b) by 0 days.

(21) Appl. No.: 12/322,814

(22) Filed: Feb. 6, 2009

(65) Prior Publication Data

US 2009/0233502 A1  Sep. 17, 2009

Related U.S. Application Data

(60) Provisional application No. 61/035,774, filed on Mar. 12, 2008.

(51) Int. Cl.
*B63B 1/38* (2006.01)
(52) U.S. Cl. .................. 114/67 R; 440/89 R; 60/317
(58) Field of Classification Search ............. 114/67 A; 440/89 R; 60/282, 317
See application file for complete search history.

(56) References Cited

U.S. PATENT DOCUMENTS

| | | | |
|---|---|---|---|
| 1,069,945 A | | 8/1913 | Hall |
| 2,450,665 A | | 10/1948 | Jutte |
| 2,954,750 A | * | 10/1960 | Crump et al. ............... 181/235 |
| 3,084,651 A | * | 4/1963 | Parmenter ................... 181/235 |
| 3,628,488 A | | 12/1971 | Gibson |
| 3,929,088 A | * | 12/1975 | DuBrow et al. ............... 440/47 |
| 4,393,802 A | | 7/1983 | Rizzo |
| 4,509,927 A | | 4/1985 | Ikeda |
| 4,862,817 A | * | 9/1989 | Hornsby et al. ........... 114/67 A |
| 4,896,621 A | * | 1/1990 | Coles .......................... 114/274 |
| 4,900,282 A | | 2/1990 | Takahashi et al. |
| 5,324,217 A | * | 6/1994 | Mineo ....................... 440/89 R |
| 5,524,568 A | | 6/1996 | Bobst |
| 5,989,082 A | | 11/1999 | Corliss |
| 6,575,106 B1 | | 6/2003 | Whitener |
| 7,004,094 B2 | * | 2/2006 | Carson ..................... 114/67 A |
| 7,252,243 B2 | | 8/2007 | Bjorn et al. |
| 7,654,212 B2 | * | 2/2010 | Takahashi ................. 114/67 A |
| 7,677,191 B2 | * | 3/2010 | Takahashi ................. 114/67 A |

FOREIGN PATENT DOCUMENTS

JP    2006-022735    1/2006

* cited by examiner

*Primary Examiner*—Stephen Avila
(74) *Attorney, Agent, or Firm*—McNair Law Firm, P.A.; Seann P. Lahey

(57) ABSTRACT

An exhaust redirect line in communication with an engine exhaust channel of a marine vehicle receiving exhaust gas. A blower unit in the exhaust redirect line directing the exhaust gas through the exhaust redirect line. A mixing chamber in communication with the exhaust redirect line receiving the engine exhaust gas. An injector unit in communication with the mixing chamber introducing a chemical agent, air and water into the mixing chamber to provide a treated exhaust gas. An output vane disposed on an exterior underside of a hull being in communication with the mixing chamber discharging the treated exhaust gas underneath the hull as a foam, whereby the engine exhaust gas is encapsulated and detoxified by the chemical agent in the foam to prevent the exhaust gas from entering the surrounding water and wherein the foam reduces friction between the hull and the surrounding water to improve engine efficiency.

17 Claims, 2 Drawing Sheets

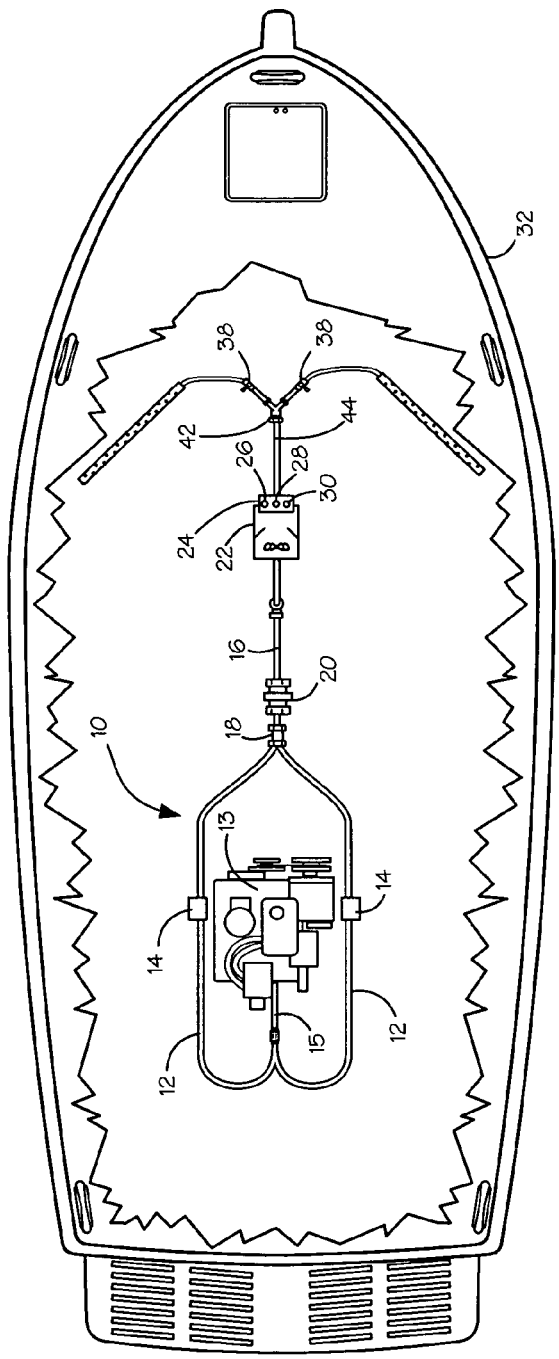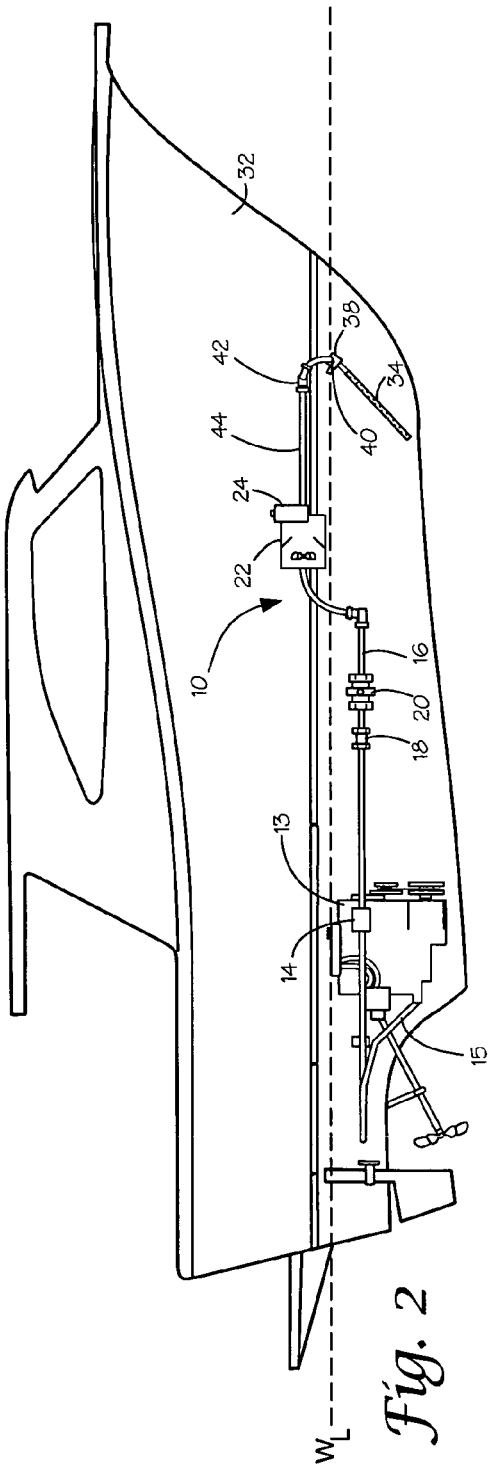

ed is a 2Sonder US 7,806,064 B2

FRICTION REDUCING POLLUTION CONTROL SYSTEM FOR MARINE VEHICLES

CROSS REFERENCE TO RELATED APPLICATION

This application claims priority from U.S. Provisional Application filed Mar. 12, 2008 under Application No. 61/035,774.

FIELD OF THE INVENTION

The present invention relates to marine vehicles, and more particularly, to a speed enhancing pollution reduction system for boats that reduces the friction of water against a boat hull using the boats engine exhaust to break the surface tension, while also encapsulating the engine exhaust in a biodegradable foam to neutralize environmentally damaging elements to prevent polluting the water.

BACKGROUND OF THE INVENTION

Pollution of waterways from marine vehicle exhaust has been an environmental problem without significant improvement. While the prior art is replete with attempted improvements in trying to clean the exhaust of marine vehicles before it enters the water, the prior art has failed to address any solution to prevent absorption of the exhaust into the water. Thus, there is a need in the art to provide a pollution control system for a marine vehicle that prevents the absorption of engine exhaust into the surrounding water. Further, there is also a need to improve the efficiency of marine vehicles by reducing the friction of water against the boat hull by breaking the surface tension between the two, which ultimately reduces pollution through more efficient vehicle operation.

The general concept of underwater exhaust for marine vehicle engines was the subject of U.S. Pat. No. 1,069,945 issued in 1913. However, this patent does not show or disclose exhaust exiting underneath the bow of a boat, being treated with a chemical to encapsulate the exhaust, nor providing the additional advantage of reducing drag on the boat hull by breaking the surface tension of the water against the hull.

U.S. Pat. No. 3,628,488 discloses an elongated flexible strip which is placed near the bow of the boat with a central tube extending under the hull. A chemical is fed into the central tube and passes out along the hull which, in a diluted form, reduces friction of the boat hull passing through water. However, this patent does not disclose the exhaust of the vessel being diverted to the bow and encapsulated by the chemical.

U.S. Pat. No. 5,524,568 discloses a system for reducing friction on a boat hull by creating a mixture of air bubbles and water adjacent to at least a portion of the hull. However, there is no discussion of encapsulating exhaust with a chemical foaming agent and discharging the mixture near the bow to reduce surface tension.

U.S. Pat. Nos. 4,393,802, 4,509,927 and 6,575,106 disclose discharging exhaust along the bottom of the hull. However, none of these references disclose a chemical foaming agent for encapsulating the exhaust.

U.S. Pat. No. 7,252,243 discloses an injection nozzle for injecting a fluid stream into a gas stream to "purify," the gas stream. Specifically, this invention states that it is well suited for hot diesel exhaust gas. This patent specifically addresses the problem of $NO_x$ creation and discloses reducing $NO_x$ concentrations with $NH_3$. However, there is no discussion of encapsulation exhaust for a marine vessel using a foaming chemical agent that is released underneath the bow of the boat to reduce surface tension.

Accordingly, it is an object of the present invention to provide a pollution control system for a marine vehicle that encapsulates the engine exhaust in a biodegradable foam to prevent absorption into the water.

It is a further object of the present invention to provide a friction reduction system that breaks the surface tension of water against the boat hull by channeling the encapsulated engine exhaust out from underneath the bow area of the boat hull.

SUMMARY OF THE INVENTION

The above objectives are accomplished according to the present invention by providing a friction reducing pollution control system for ships, sail & powerboats that redirects the exhaust from an engine closer to the bow of the boat, and treating the exhaust with a chemical, air and water mixture to detoxify the exhaust prior to discharging the exhaust beneath the hull of the boat and into the surrounding water. The chemical additive for mixing with the exhaust is generally a foaming agent which when injected under the hull and mixed with the exhaust, both encapsulates the exhaust as well as reduces friction under the hull by breaking the surface tension of the water under the hall. By reducing friction of the water on the hull, less power is required to maintain a given speed. Further, the encapsulated exhaust is prevented from being absorbed into the water to prevent pollution of the water. The chemical foaming agent is biodegradable or otherwise environmentally safe so that as it degrades the foaming agent does not cause any pollution, and because it neutralizes the environmentally damaging exhaust elements, there is no pollution as the foam degrades.

Accordingly, in an embodiment of the invention, a friction reducing pollution control system for marine vehicles is provided comprising an exhaust redirect line in communication with an engine exhaust channel receiving engine exhaust gas; a blower unit disposed in the exhaust redirect line directing the engine exhaust gas through the exhaust redirect line; a mixing chamber in communication with the exhaust redirect line receiving the engine exhaust gas; an injector unit in communication with the mixing chamber introducing a chemical agent, air and water into the mixing chamber to provide a treated exhaust gas; and, an output vane disposed on an exterior underside of a hull being in communication with the mixing chamber discharging the treated exhaust gas underneath the hull as a foam; whereby, the engine exhaust gas is encapsulated and detoxified by the chemical agent in the foam to prevent the exhaust gas from entering the surrounding water and wherein the foam reduces friction between the hull and the surrounding water to improve engine efficiency.

In a further embodiment, the output vane includes an interior channel extending generally the length of the output vane receiving the treated exhaust gas so that the treated exhaust gas is distributed across the length of the output vane.

In a further embodiment, the output vane is porous so that the treated exhaust gas is discharged along the entire length of the output vane in a foaming arrangement.

In a further embodiment, a pair of output vanes disposed in an opposing fashion on port and starboard sides of the exterior underside of the hull, wherein each of the output vanes is preferably angled rearwardly to extend generally outwardly from the keel towards the stern of the hull.

In a further embodiment, the injector unit includes a chemical injector, an air injector, and a water injector each in fluid communication with the mixing chamber for introducing the chemical agent, the air and the water into the mixing chamber respectively to treat the engine exhaust gas.

In a further embodiment, the blower unit is operatively associated with the engine so that the RPM of the blower unit is controlled by the RPM of the engine to adjust the speed of the blower unit to accommodate the exhaust volume output of the engine at varying RPMs to prevent blowback and excessive backpressure.

In a further embodiment, a first exhaust feed line is provided directing the engine exhaust gas from at least two the exhaust redirect lines into the mixing chamber.

In a further embodiment, a blowback valve is disposed in the first exhaust feed line to prevent the engine exhaust gas from backing up into the exhaust redirect lines.

In a further embodiment, the injector unit is operatively associated with the engine so that the volume of the air, water and chemical agent injected into the mixing chamber is controlled by the engine RPM to maintain a volume of the air, water and chemical agent in the mixing chamber to treat all the engine exhaust gas directed into the mixing chamber.

In a further embodiment, a second feed line is provided exiting the mixing chamber and directing the treated exhaust gas into a through-hull fitting in fluid communication with the output vane to channel the treated exhaust gas into the output vane for being expelled underneath the hull.

In a further embodiment, a back flush valve is disposed in the through-hull fitting to prevent water from entering into the hull through the output vane.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 1 shows a top plan cutaway view of a boat hull having a friction reducing pollution control system according to the present invention;

FIG. 2 shows a side elevation cutaway view of a boat hull having a friction reducing pollution control system according to the present invention; and, FIG. 3 shows a front elevation view of a boat hull having a friction reducing pollution control system according to the present invention.

DETAILED DESCRIPTION OF A PREFERRED EMBODIMENT

Figure 3:
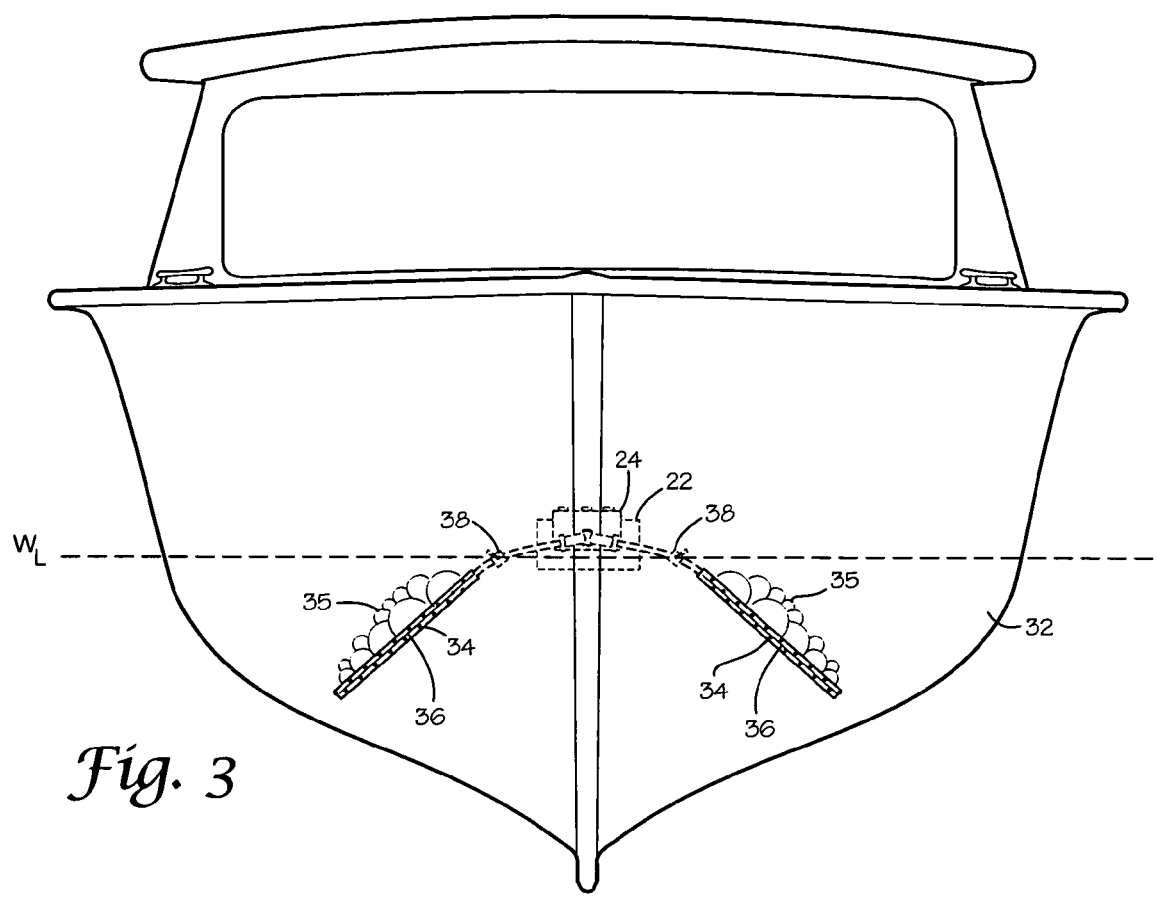

With reference to the drawings, the invention will now be described in more detail. Referring to FIGS. 1-3, a boat hull is shown having a friction reducing and pollution control system incorporated therein that is adaptable for use with exiting motors and engines. The system redirects exhaust elements and coolants through the pollution control system, designated generally as 10, and then expels a treated exhaust gas underneath a bow section of the boat in an efficient arrangement to eliminate exhaust pollution from entering the water while also reducing friction against the boat hull by breaking the surface tension of the water against the hull.

The system includes at least one exhaust redirect line 12 that attaches to the exhaust system 15 of the engine 13. Coolant waters are not passed into exhaust redirect line 12, but exhausted directly overboard from the vessel. In the illustrated embodiment, the engine system is a dual exhaust system with a pair of exhaust redirect lines 12 are provided for receiving all exhaust fumes expelled from the engine. For multiple exhaust channels of two or more, an exhaust redirect line 12 is provided for each separate engine exhaust channel. Preferably, the exhaust redirect lines 12 are incorporated into the engine exhaust system following the muffler and other exhaust treatment equipment, such as catalytic converters, to maximize the benefits of existing pollution reduction equipment before treating the exhaust according to the present invention.

Each exhaust redirect line 12 includes a blower unit 14 in fluid communication with the engine exhaust passing through the redirect line 12. Blower unit 14 draws the engine exhaust into the redirect lines 12 and force the exhaust downstream through the exhaust redirect lines 12. Each blower unit 14 is operatively associated with the engine. In this arrangement the RPM of blower unit 14 is controlled by the engine RPM and related computer controls to adjust the speed of the blower unit to accommodate the exhaust volume output of the engine at varying RPMs to prevent issues of blowback and excessive backpressure, while maintaining the necessary backpressure in the exhaust system for proper engine operation.

Exhaust redirect lines 12 are joined into a single exhaust feed line 16 when, as in the illustrated embodiment, the engine exhaust system utilizes multiple exhaust channels. It should be noted that in marine vehicles utilizing multiple engines, it may be necessary to provide separate pollution control systems 10 for each engine to accommodate the volume of exhaust expelled. Preferably, exhaust redirect lines 12 are joined together at joint 18 into feed line 16 at a point approximately one-third of the total length of the vessel from the most forward point of the bow. Due to the exhaust volume doubling into feed line 16 and being forced there through by blower units 14, it is preferred that a blowback valve 20 be provided in fluid communication with the exhaust gas in feed line 16 to prevent exhaust gas from backing up into exhaust redirect lines 12 and creating excessive backpressure.

Exhaust feed line 16 is received in mixing chamber 22 for treatment to encapsulate the exhaust in a non-hazardous biodegradable foaming chemical agent. The chemical agent is designed for the application of absorbing and encasing the exhaust gases to neutralize the toxic exhaust elements containing the environmentally harmful molecules of the petrochemicals. As the encapsulated exhaust is expelled underneath the bow, it is converted to a foam. Additionally, the chemical agent further includes the ability to adhere as a thin film on the surface of the boat's hull when expelled underneath the bow to reduce friction by helping to break the surface tension of water against the hull, prevents rust, and prohibits adhesion of marine growths on the hull. The foaming action of the chemical agent also help to break the surface tension of the water against the hull when expelled underneath the bow, which improves the speed and efficiency of the boat. In a preferred embodiment, the chemical agent selected is commonly known as "Thick & Foamy", which is a liquid foaming detergent manufactured by JBS industries, 2550 Henkle Drive, Lebanon, Ohio 45036 and provides the above described abilities.

An injector unit 24 is provided in fluid communication with mixing chamber 22. Injector unit 24 includes a chemical injector 26, a water injector 28, and an air injector 30 for mixing the engine exhaust gas with the foaming chemical agent, an amount of water and an amount of air. The volumes of chemical foaming agent, water and air injected are sufficient to treat the volume of exhaust feeding into mixing chamber 22. Accordingly, in a preferred embodiment, the injectors are operatively associated with the engine RPM to increase or decrease the injected volumes of chemical agent, air and water into mixing chamber 22 sufficient to treat the exhaust gas volume at any given moment so that all exhaust gas in mixing chamber 22 is encapsulated into the chemical agent. Injection of the air and water promote the foaming action of the chemical agent once expelled underneath the bow, as well as to promote the encapsulation of the exhaust.

Mounted to the exterior of hull 32 are a pair of output vanes 34 disposed in an opposing fashion on port and starboard sides of hull 32. Each of output vanes 34 are preferably angled rearwardly to extend generally from the keel towards the stern of hull 32 and outwardly on the port and starboard sides respectively. Each of output vanes 34 is constructed and arranged to provide a streamline shape and is made from a porous material to expel the treated exhaust gas. An interior channel 36 is provided in each output vane 34 for distributing the treated exhaust gas along the length of the output vane, where it is then expelled through the porous material of the output vanes 34. As it is expelled, the chemical agent foams 35 so that the boat hull is traveling over a bed of foam that reduces the friction of the water against the hull. In a preferred embodiment, output vanes 34 are formed having a length that is two-thirds of 50% of the total beam, and the width is determined according to the appropriate volume of throughput desired for the particular vehicle. The greater the width of the output vanes, the more foam applied underneath the hull.

A through-hull fitting 38, such as a "sea" valve is provided for penetration of the hull to channel the treated exhaust through hull 32 on each side to output vanes 34. Through-hull fitting 38 is provided in fluid communication with output vanes 34 for channeling the treated exhaust gas into the output vanes for being expelled underneath the hull. Preferably, through-hull fitting 38 includes a back flush valve to prevent water from entering through into the feed lines through output vanes 34. Preferably, through-hull fitting 38 includes a shut-off valve 40 disposed on the interior side of hull 32 for manual closing of the feed lines directing treated exhaust gas into output vanes 34. A Y-valve 42 is provided along a second feed line 44 that feeds into through-hull fittings 38. Thus, following mixing chamber 22, secondary feed line 44 channels the treated exhaust gas from mixing chamber 22 into Y-valve 42, which divides and channels the treated exhaust gas into through-hull fittings 38 for expulsion from each of output vanes 34.

In operation, gases contained in the engine exhaust are treated with a non-hazardous biodegradable chemical agent that encapsulates the exhaust and detoxifies it prior to entering the surrounding water to the marine vehicle, thus removing destructive environmental pollutants. The detoxifying chemical agent is converted from a liquid solution that exits mixing chamber 22 to a foam as the material is discharged through output vanes 34. This foaming action reduces friction between the water and boat hull to allow a reduction of engine power to maintain a given speed, or conversely, to provide a higher speed for a given engine power, thus saving fuel costs and/or time through increased efficiency. Further, due to the chemical properties of the chemical agent, application of the chemical to the underside of the hull results in no marine growth on the hull, thus saving dry-dock repair costs and idle time for such repairs.

While a preferred embodiment of the invention has been described using specific terms, such description is for illustrative purposes only, and it is to be understood that changes and variations may be made without departing from the spirit or scope of the following claims.

What is claimed is:

1. A friction reducing pollution control system for marine vehicles comprising:
    an exhaust redirect line in communication with an engine exhaust channel receiving engine exhaust gas;
    a blower unit disposed in said exhaust redirect line directing said engine exhaust gas through said exhaust redirect line;
    a mixing chamber in communication with said exhaust redirect line receiving said engine exhaust gas;
    an injector unit in communication with said mixing chamber introducing a chemical agent, air and water into said mixing chamber to provide a treated exhaust gas; and,
    an output vane disposed on an exterior underside of a hull being in communication with said mixing chamber discharging said treated exhaust gas underneath the hull as a foam;
    whereby, said engine exhaust gas is encapsulated and detoxified by said chemical agent in said foam to prevent said exhaust gas from entering the surrounding water and wherein said foam reduces friction between said hull and the surrounding water to improve engine efficiency.

2. The system of claim 1, wherein said output vane includes an interior channel extending generally the length of said output vane receiving said treated exhaust gas so that said treated exhaust gas is distributed across the length of said output vane.

3. The system of claim 2, wherein said output vane is porous so that said treated exhaust gas is discharged along the entire length of said output vane in a foaming arrangement.

4. The system of claim 1, a pair of output vanes disposed in an opposing fashion on port and starboard sides of said exterior underside of said hull, wherein each of said output vanes is preferably angled rearwardly to extend generally outwardly from the keel towards the stern of said hull.

5. The system of claim 1, wherein said injector unit includes a chemical injector, an air injector, and a water injector each in fluid communication with said mixing chamber for introducing said chemical agent, said air and said water into said mixing chamber respectively to treat said engine exhaust gas.

6. The system of claim 1, wherein said blower unit is operatively associated with the engine so that the RPM of said blower unit is controlled by the RPM of the engine to adjust the speed of the blower unit to accommodate the exhaust volume output of the engine at varying RPMs to prevent blowback and excessive backpressure.

7. The system of claim 1, including a first exhaust feed line directing said engine exhaust gas from at least two said exhaust redirect lines into said mixing chamber.

8. The system of claim 7, including a blowback valve disposed in said first exhaust feed line to prevent said engine exhaust gas from backing up into said exhaust redirect lines.

9. The system of claim 1, wherein said injector unit is operatively associated with said engine so that the volume of the air, water and chemical agent injected into said mixing chamber is controlled by the engine RPM to maintain a volume of the air, water and chemical agent in said mixing chamber to treat all said engine exhaust gas directed into said mixing chamber.

10. The system of claim 1, including a second feed line exiting said mixing chamber and directing said treated exhaust gas into a through-hull fitting in fluid communication with said output vane to channel said treated exhaust gas into said output vane for being expelled underneath the hull.

11. The system of claim 10, including a back flush valve disposed in said through-hull fitting to prevent water from entering into said hull through said output vane.

12. A friction reducing pollution control system for marine vehicles comprising:

an engine having an engine exhaust system disposed in a stern portion of the vehicle;

an exhaust redirect line in communication with the engine exhaust system receiving engine exhaust gas from said engine exhaust system and channeling said engine exhaust gas towards a bow portion of the vehicle;

a mixing chamber in communication with said exhaust redirect line receiving said engine exhaust gas;

an injector unit introducing a chemical agent, air and water into said mixing chamber to provide a treated exhaust gas; and, an output vane disposed on an exterior underside of said hull generally towards said bow being in communication with said mixing chamber discharging said treated exhaust gas underneath the hull;

whereby said treated exhaust gas produces a foam when discharged that prevents said exhaust gas from entering the surrounding water and reduces friction between said hull and the surrounding water to improve engine efficiency.

13. The system of claim 12 including a blower unit disposed in said exhaust redirect line directing said engine exhaust gas through said exhaust redirect line into said mixing chamber, wherein said blower unit is operatively associated with said engine so that the RPM of said blower unit is controlled by the RPM of said engine to adjust the speed of the blower unit to accommodate the exhaust volume output of said engine at varying RPMs to prevent blowback and excessive backpressure.

14. The system of claim 12, wherein said output vane includes an interior channel extending generally the length of said output vane receiving said treated exhaust gas so that said treated exhaust gas is distributed across the length of said output vane, and wherein said output vane is porous so that said treated exhaust gas is discharged along the entire length of said output vane.

15. The system of claim 12, wherein said injector unit includes a chemical injector, an air injector, and a water injector each in fluid communication with said mixing chamber for introducing said chemical agent, said air and said water into said mixing chamber respectively to treat said engine exhaust gas.

16. The system of claim 15, wherein each of said chemical injector, said air injector, and said water injector are operatively associated with said engine so that the volume of the air, water and chemical agent injected into said mixing chamber is controlled by the engine RPM to maintain a volume of the air, water and chemical agent in said mixing chamber to treat all said engine exhaust gas directed into said mixing chamber.

17. The system of claim 12, including a through-hull fitting in fluid communication with said output vane and said mixing chamber to channel said treated exhaust gas into said output vane for being expelled underneath the hull, wherein said through-hull fitting includes a back flush valve to prevent water from entering into said hull through said output vane.

* * * * *